United States Patent [19]
Wofford et al.

[11] Patent Number: 4,746,522
[45] Date of Patent: May 24, 1988

[54] COMPOSITION AND METHOD FOR TREATING MEAT TO REDUCE MOISTURE LOSS DURING COOKING

[76] Inventors: Miles D. Wofford, Rt. 1 Box 222C, Anthony, N. Mex. 88021; John M. Wofford, 5718 Macon Ln., El Paso, Tex. 79924

[21] Appl. No.: 830,865

[22] Filed: Feb. 19, 1986

[51] Int. Cl.$^4$ .............................................. A23L 1/00
[52] U.S. Cl. ................................... 426/243; 426/264; 426/293; 426/281; 426/392; 426/641; 426/652
[58] Field of Search .............................. 426/264–266, 426/281, 310, 332, 652, 645, 576

[56] References Cited

U.S. PATENT DOCUMENTS

| Re. 26,054 | 7/1966 | Humphreys et al. | 426/332 X |
|---|---|---|---|
| 2,442,663 | 6/1948 | Rinehart | 426/576 |
| 2,906,629 | 9/1959 | Oppenheimer | 426/576 |
| 3,119,696 | 1/1964 | Williams | 426/281 X |
| 3,231,392 | 1/1966 | Sair | 426/281 X |
| 3,425,850 | 2/1969 | Savage et al. | 426/281 |
| 3,506,455 | 4/1970 | Savage et al. | 426/281 X |
| 3,695,892 | 10/1972 | Reinke | 426/281 |
| 4,343,821 | 8/1982 | Rose | 426/281 X |

FOREIGN PATENT DOCUMENTS 8201640  5/1982  PCT Int'l Appl. ................. 426/281

Primary Examiner—Raymond N. Jones
Assistant Examiner—C. Callahan
Attorney, Agent, or Firm—Shlesinger, Arkwright & Garvey

[57] ABSTRACT

A composition for treating meat to reduce moisture loss incurred during cooking in which the percentage of meat varies from about 9.91% to about 66.67% by total weight of the treated produced comprising between about 0.001% and 0.180% by total weight of the treated product of about a 1% to 10% acetic acid solution, between about 0.034% and 0.180% by total weight of the treated product of gelatin, between about 0.350% and 2.500% by total weight of the treated product of starch, between about 0.001% and 1.250% by total weight of the treated product of sodium chloride, between about 0.001% and 0.500% by total weight of the treated product of a phosphate salt, and the balance being non-halogenated water, the percent by total weight of the non-halogenated water being inversely related to the percent by total weight of the treated product of the meat and being between about 6.91% and 31.08% by total weight of the treated product.

35 Claims, 1 Drawing Sheet

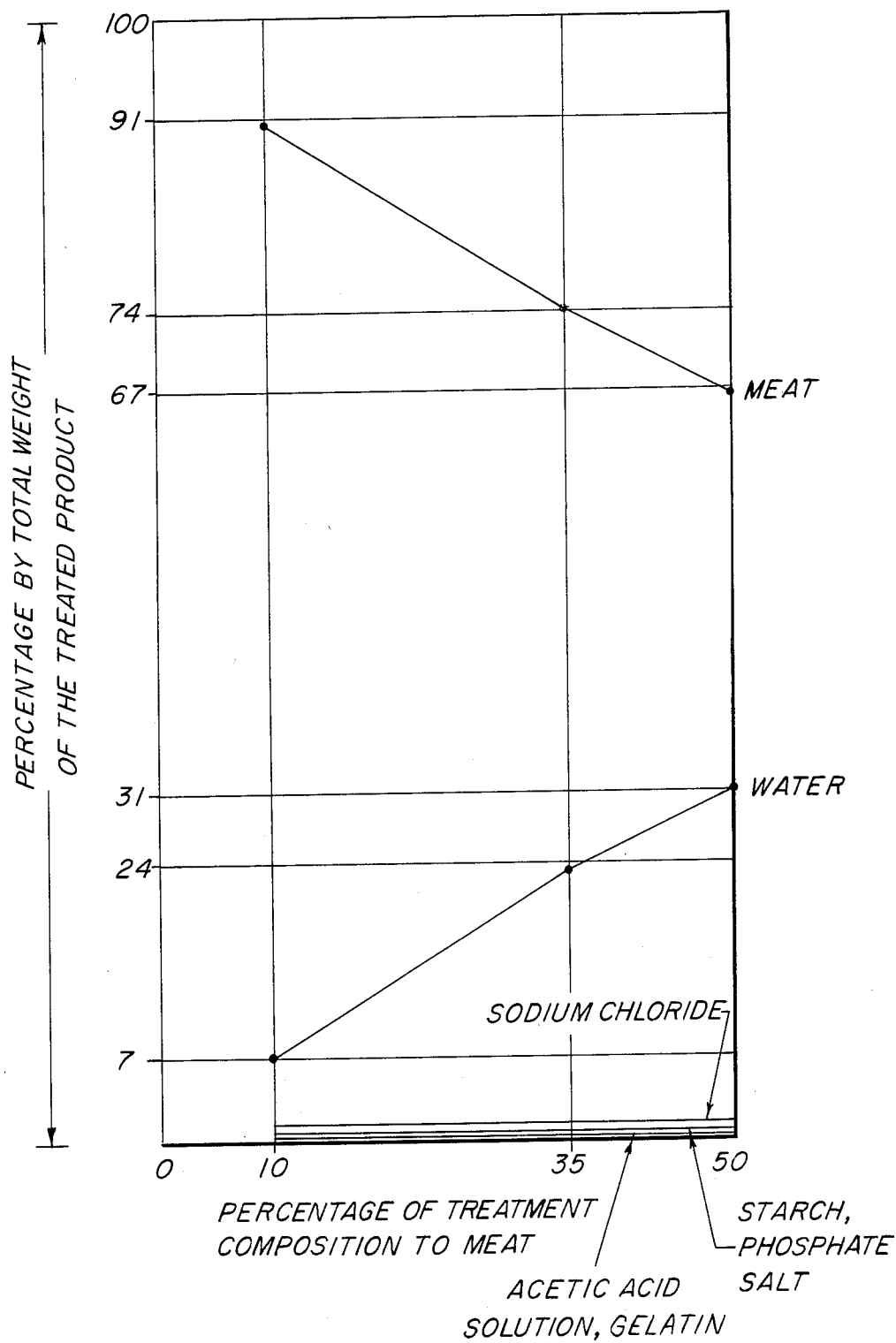

COMPOSITION AND METHOD FOR TREATING MEAT TO REDUCE MOISTURE LOSS DURING COOKING

FIELD OF THE INVENTION

The present invention relates to a composition as well as a method for treating meat in order to reduce moisture loss incurred during cooking. The invention further includes the use of a unique combination of moisture control agents which are activated as a result of internal heating of the meat during the cooking process.

BACKGROUND OF THE INVENTION

It is common knowledge that all meat products undergo a substantial weight loss during cooking. This weight loss occurs due to the cooking out of the natural meat juices during the cooking process further resulting in a substantial shrinkage of the cooked meat product.

For example, an untreated beef roast will loose between 25% and 30% of its pre-cooked weight through cooking. This weight loss represents a significant loss in revenue to the producers of pre-cooked meet products, and such a loss of revenue is ultimately passed down to the consumer in terms of higher meat prices.

In an attempt to minimize revenue losses, it has become a standard practice throughout the meat industry to inject uncooked meat with various brine solutions, such as aqueous solutions of sodium chloride and one or more phosphate salts, in order to partially inhibit as well as to compensate for excessive moisture loss incurred during cooking.

As a typical example, a beef roast having a pre-cooked weight of 10 pounds is injected with 1 pound of a brine solution comprising 0.825 pounds of water, 0.125 pounds of sodium chloride and 0.050 pounds sodium tripolyphosphate and subsequently cooked. After cooking, the product weight was about 10 pounds indicating a moisture loss of approximately 10%.

Thus, it may be seen that pre-treatment of the meat with the brine solution significantly reduced the amount of cooked out juices as compared with the example for untreated meat wherein a weight loss of about 25 to 30% resulted. To date, it has been impossible to achieve a controlled moisture loss of less than about 10%.

SUMMARY AND OBJECTS OF THE INVENTION

The present invention involves the use of a unique combination of moisture control agents which when dispersed throughout uncooked meat results in a controlled moisture loss due to cooking of about 3% to 5%. As unexpected side benefits, meats which were cooked after being treated according to the present invention were found to be improved in terms of tenderness and texture and had better color than meats treated according to prior methods.

In addition, it was discovered that after cooking, meats treated according to the present invention were capable of being stored under refrigeration for longer periods of time than had been previously possible without undergoing deterioration in terms of moisture seepage, while the flavor, tenderness, texture and overall appearance remained unchanged.

It was further found that meats which were treated according to the present invention and then cooked and frozen for indefinite periods of time were capable of being thawed without adversely affecting the quality of the meat, and could subsequently be reheated either by conventional or by microwave heating without deterioration of the meat in terms of flavor, tenderness, texture, moisture seepage and overall appearance.

Meats to be treated according to the present invention include but are not limited to beef, pork, lamb and poultry, either in whole form or in comminuted form. Whole forms of meats include roasts, briskets, hams, etc. Comminuted meats include those meats or mixtures thereof which are subsequently formed into patties, sausages, wieners, luncheon meats, etc.

The composition used in treating the various meats is comprised of non-halogenated water, acetic acid, gelatin, starch, sodium chloride and one or more phosphate salts.

The composition is prepared by combining the water at a temperature of between about 32° F. and 75° F. with the acetic acid, gelatin and starch. The mixture is then agitated. The mixture is agitated for a period of time sufficient to uniformly disperse the gelatin and starch throughout the water and acetic acid to form a slurry. The slurry is then maintained at a temperature of between about 32° F. and 75° F. until the gelatin granules have become swollen and hydrated. Next, the slurry is again agitated and the sodium chloride and the phosphate salt is added to form a briny slurry.

When whole, non-comminuted meats are to be treated, the briny slurry may be added thereto by the common method of needle injection. When using needle injection, the slurry is maintained under constant agitation in order to prevent settling out of the solid components. The slurry is fed under pressure through a plurality of uniformly spaced-apart elongated needles which are used to penetrate the meat. The slurry is fed into the meat interior preferably in a continuous manner during both penetration as well as during withdrawl of the needles.* Following the injection step, the meat is massaged or tumbled for a period of time sufficient to uniformly disperse the slurry throughout the meat interior.

*Although it could be fed at anytime after penetration.

In the case of comminuted meat, ground or other processed meat the slurry may be added by injection or by any other suitable means. After the slurry has been added to the comminuted meat, the meat is tumbled or kneaded to uniformly disperse the slurry therethrough.

One of the critical steps in preparing the slurry is the pre-hydration or swelling of the gelatin granules in the non-chlorinated acidified water solution.

While the exact mechanism is not completely understood, it is believed that the unexpected results in terms of low moisture loss during cooking of the meat is due in large part to the hydration of the starch in combination with the action of the other ingredients during the cooking process. The starch and gelatin appear to draw up and hold the excess moisture during internal heating of the meat while the sodium chloride and phosphate salt appear to migrate into the meat pores to prevent excessive moisture loss through the meat surface.

It is therefore an object of the present invention to provide a unique composition and method for treating meat to reduce moisture loss incurred during the cooking process.

Another object of the present invention is to provide pre-cooked meat products having improved tenderness, texture and color.

A further object of the present invention is to provide pre-cooked meat products which are stable under extended periods of refrigeration, as well as during freeze-thaw and during reheating including conventional as well as microwave heating.

A still further object of the present invention is to provide a method for treating a variety of meats in whole or comminuted form in order to reduce moisture loss incurred during cooking.

Another object of the present invention is to provide a composition for treating meat in order to reduce moisture loss incurred during cooking which does not adversely affect the meat flavor.

The foregoing as well as other objects and advantages of the present invention will appear from the following detailed description, taken in conjunction with the accompanying drawing, in which:

FIG. 1 is a graph plotting weight percentages of the individual constituents forming the treated product as a function of the treatment composition to meat weight percentages.

DETAILED DESCRIPTION OF THE INVENTION

Referring to the graph of FIG. 1, it may be seen that the horizontal axis provides percentages which are based upon the total weight of the treatment composition to the total weight of the meat. As hereinafter referred to, the treatment composition will be defined as the composition comprising water, acetic acid solution, gelatin, starch, phosphate salt and sodium chloride salt. The vertical axis provides weight percentages based upon the total weight of the treated product. The treated product, as hereinafter referred to, will be defined as the meat after the addition thereto of the treatment composition.

For the sake of clarity, minimum and maximum values for each of the individual constituents forming the treatment composition have been omitted from the graph of FIG. 1. The values plotted for each of the individual constituents of the treatment composition represent preferred values.

Where the percentage of meat varies from about 90.91% to about 66.67% by total weight of the treated product, the treatment composition is comprised of between about 0.001% and 0.180% by total weight of the treated product of about a 1% to 10% acetic acid solution, between about 0.034% and 0.180% by total weight of the treated product of gelatin, between about 0.350% and 2.50% by total weight of the treated product of starch, between about 0.001% and 1.250% by total weight of the treated product of sodium chloride, between about 0.001% and 0.500% by total weight of the treated product of a phosphate salt, and the balance being non-halogenated water, wherein the percent by total weight of the treated product of the non-halogenated water is inversely related to the percent by total weight of the treated product of the meat and wherein the non-halogenated water ranges between about 6.91% and 31.08% by total weight of the treated product.

While in the preceding paragraph the individual ingredients of the treatment composition have been expressed in terms of percent by weight of the treated product (treatment composition plus meat), they may also be expressed in terms of percent by weight of the treatment composition.

In this case, minimum values are obtainable by basing calculations on a 50% injection ratio where 66.67% of the treated product is meat and 33.33% of the treated product is treatment composition.

Maximum values are obtainable by basing calculations on a 10% injection ratio where 90.91% of the treated product is meat and where 9.09% of the treated product is treatment composition.

The following conversation factor is used for calculating minimum values of each ingredient in terms of percent by weight of the treatment composition, $$\frac{100 \times (\text{Min. \% by Wt. of Treated Product Value})}{33.33}$$

Thus, for gelatin, the minimum value is $$\frac{100 \times .034}{33.33}$$

or 0.102% by weight of treatment composition.

For calculating maximum values of each ingredient in terms of % by weight of the treatment composition, we use, $$\frac{100 \times (\text{Max. \% by Wt. of Treated Product Value})}{9.09}$$

For gelatin, the maximum value is $$\frac{100 \times .180}{9.09}$$

or 1.98% by weight of the treatment composition.

Using these conversion factors for each of the ingredients of the treatment composition, we obtain a composition comprising about 0.003% to about 1.98% by weight of about a 1% to 10% acetic acid solution, about 0.102% to about 1.98% by weight of gelatin, about 1.05% to about 27.50% by weight of starch, about 0.003% to about 13.75% by weight of sodium chloride, about 0.003% to about 5.50% by weight of a phosphate salt, and the balance of the composition being non-halogenated water.

In a preferred embodiment, the acetic acid solution is 5% acid vinegar, the starch is non-gelatinized starch and the non-halogenated water is distilled water. By non-gelatinized starch, it is meant starch which has not been pre-cooked. A pre-cooked starch would be for example instant starch.

The phosphate salt may be one or more of the salts including sodium tripolyphosphate, disodium phosphate, monosodium phosphate, sodium metaphosphate, sodium polyphosphate, sodium pyrophosphate, sodium acid pyrophosphate, dipotassium phosphate, monopotassium phosphate, potassium pyrophosphate and potassium tripolyphosphate. In the preferred embodiment, sodium tripolyphosphate is used as the sole phosphate salt.

EXAMPLE 1

(10% by Wt. of Treatment Composition to Meat)

|  | WT. | % BY WT. OF TREATED PRODUCT |
|---|---|---|
| Meat | 10.00 lb. | 90.909% |

-continued

| | WT. | % BY WT. OF TREATED PRODUCT |
|---|---|---|
| TREATMENT COMPOSITION | | |
| Distilled Water | .7600 lb. | 6.909% |
| 5% Acid Vinegar | .0075 lb. | .068% |
| Gelatin | .0075 lb. | .068% |
| Starch | .0500 lb. | .455% |
| Sodium Chloride | .1250 lb. | 1.136% |
| Sodium Tripolyphosphate | .0500 lb. | .455% |
| TOTAL | 1.000 lb. | 9.091% |

The values listed in Example 1 may be given in terms of percent by weight of the treatment composition by using the conversion factor $$\frac{100 \times (\% \text{ by Wt. of Treated Product Value})}{9.091}$$

to give a treatment composition comprising 76.0% by weight of distilled water, 0.75% by weight of 5% acid vinegar, 0.75% by weight of gelatin, 5.0% by weight of starch, 12.5% by weight of sodium chloride and 5.0% by weight of sodium tripolyphosphate.

EXAMPLE 2

(35% by Wt. of Treatment Composition to Meat)

| | WT. | % By Wt. of Treated Product |
|---|---|---|
| Meat | 10.00 lb. | 74.074% |
| TREATMENT COMPOSITION | | |
| Distilled Water | 3.1860 lb. | 23.600% |
| 5% Acid Vinegar | .0090 lb. | .067% |
| Gelatin | .0090 lb. | .067% |
| Starch | .0610 lb. | .452% |
| Sodium Chloride | .1680 lb. | 1.244% |
| Sodium Tripolyphosphate | .0670 lb. | .496% |
| Total | 3.5000 lb. | 25.926% |

The values listed in Example 2 may be given in terms of percent by weight of the treatment composition by using the conversation factor $$\frac{100 \times (\% \text{ by Wt. of the Treated Product Value})}{25.926}$$

to give a treatment composition comprising 91.03% by weight of distilled water, 0.26% by weight of 5% acid vinegar, 0.26% by weight of gelatin, 1.74% by weight of starch, 4.80% by weight of sodium chloride and 1.91% by weight of sodium tripolyphosphate.

EXAMPLE 3

(50% by Wt. of Treatment Composition to Meat

| | WT. | % By Wt. of Treated Product |
|---|---|---|
| Meat | 10.00 lb. | 66.667% |
| TREATMENT COMPOSITION | | |
| Distilled Water | 4.6620 lb. | 31.080% |
| 5% Acid Vinegar | .0100 lb. | .067% |
| Gelatin | .0100 lb. | .067% |
| Starch | .0680 lb. | .453% |
| Sodium Chloride | .1850 lb. | 1.233% |
| Sodium Tripolyphosphate | .0650 lb. | .433% |

-continued

| | WT. | % By Wt. of Treated Product |
|---|---|---|
| Total | 5.0000 lb. | 33.333% |

The values listed in Example 3 may given in terms of percent by weight of treatment composition by using the conversion factor $$\frac{100 \times (\% \text{ by Wt. of the Treated Product Value})}{33.333}$$

to give a treatment composition comprising 93.24% by weight of distilled water, 0.20% by weight of 5% acid vinegar, 0.20% by weight of gelatin, 1.36% by weight of starch, 3.7% by weight of sodium chloride and 1.3% by weight of sodium tripolyphosphate.

While only three examples have been set forth, namely, for the cases of 10%, 35% and 50% of treatment composition to meat, it should be understood that this application is intended to cover all variations according to the graph of FIG. 1 when taken in conjunction with the minimum and maximum values of the individual constituents of the treatment composition as previously set forth.

In treating meat to reduce moisture loss incurred during cooking, the gelatin, preferably in a granular state, and the starch are added to the water and *acetic acid solution, wherein the water is at a temperature of between about 32° and 75° F. Alternatively, the starch and granular gelatin may be first blended together and then added to a previously agitated mixture of the water and acetic acid solution.
*such as vinegar Next, the ingredients are agitated for a period of time sufficient to disperse the gelatin and the starch uniformly throughout the water and the acetic acid solution so as to form a slurry. Optimum results have been achieved by rigorously agitating the mixture for a period of about 5 minutes in order to cause further shearing of the gelatin granules. After the agitation is completed, the slurry is maintained at a temperature of between about 32° F. and 75° F. in order to allow the gelatin granules to become swollen and hydrated. Proper swelling and hydration of the gelatin granules occurs after about 20 minutes.

After sufficient hydration of the gelatin granules has occurred, the sodium chloride and the phosphate salt are added to the slurry while the slurry is again agitated thereby dissolving the sodium chloride and phosphate salt to form a briny slurry. The briny slurry is then added to the meat and is dispersed throughout the meat by subjecting the meat to a tumbling, kneading or massaging action.

All meats including beef, pork, lamb and poultry may be treated according to the present invention. The meat may be in whole or in comminuted form.

In the case of whole meats such as roasts, briskets, hams and poultry, the briny slurry may be added by injection. A preferred method of injection involves the use of a plurality of uniformly spaced injection needles whereby the briny slurry is pumped into the meat interior in a continuous manner during both penetration and withdrawl of the needles. By using such a technique, the briny slurry is more evenly distributed throughout the meat interior precluding excessive accumulation of the slurry in individual pockets. Further distribution or dispersement of the slurry is achieved after injection by tumbling or massaging the meat. Optimum results have been achieved by tumbling or massaging the meat for a period of between about 3 and 5 hours.

When the injection technique is used, it is important to prevent the slurry from settling prior to injection. This may be accomplished by maintaining the slurry under agitation in a holding tank during injection.

In the case of comminuted meat, the slurry may be incorporated into the meat by injection or by any other suitable means. Subsequent tumbling, kneading or massaging of the meat will cause the slurry to be evenly distributed therethrough. The treated meat may then be molded or otherwise shaped to form any number of food products including patties, sausages, wieners and luncheon meats.

Once the slurry has been dispersed throughout the meat, the meat may subsequently be cooked until the desired internal temperature is reached, packaged and refrigerated or frozen. Alternatively, once the slurry has been dispersed throughout the meat, the meat may be packaged, cooked then refrigerated or frozen.

The meat may be cooked by any conventional method including microwaving. In cases where the treated meat has been frozen after cooking, it may be subsequently thawed and reheated by any conventional heating method including microwaving without adversely affecting the meat in terms of tenderness, texture, color or flavor.

EXAMPLE 4

In treating a 10 lb. beef roast with the treatment composition of example 1, the distilled water* at a temperature of about 50° F. was added to the vinegar and agitated. The starch and granular gelatin were separately blended then slowly added to the agitated solution of water and vinegar. The mixture was maintained under rigorous agitation for an additional 5 minutes to uniformly disperse the gelatin and the starch throughout the water and vinegar solution to form a slurry. The slurry was maintained at a temperature of about 50° F. for about 20 minutes to cause swelling and hydration of the gelatin granules. After the 20 minute period, the slurry was again agitated and the sodium chloride and sodium tripolyphosphate were added thereto and dissolved to form a briny slurry. The briny slurry was transferred to a holding tank and again subjected to agitation to prevent settling. The briny slurry was then incorporated into the uncooked beef roast by needle injection. After injection, the meat was tumbled for a period of about 4 hours to evenly distribute the slurry throughout the meat interior. The treated meat was then cooked until the desired internal temperature was attained.

*or non-halogenated distilled water

The beef roast prepared according to the above example was determined to have undergone shrinkage due to moisture loss during cooking of only approximately 4%. In addition, the tenderness, texture and color of the meat after cooking were rated as above average.

COMPARATIVE EXAMPLE

A 10 lb. beef roast was injected according to the method of Example 4 with 1 lb. of an aqueous slurry consisting of 0.825 lb. of halogen treated tap water, 0.125 lb. of sodium chloride and 0.050 lb. of sodium tripolyphosphate. The treated meat was then tumbled for about 4 hours to disperse the slurry throughout the meat interior. The meat was then cooked for the same amount of time as in Example 4. After cooking, the meat was determined to have undergone a shrinkage due to moisture loss of approximately 10%. The meat was less tender and less suitable in terms of texture than the meat prepared according to the method of Example 4. In addition, the meat was less appealing in terms of color, i.e. the meat had lost its natural reddish-pink color and had turned brown.

Similar comparitive results concerning shrinkage, tenderness, texture and color occurred using various other types of meats in other various forms.

While this invention has been described in connection with different embodiments thereof, it will be understood that it is capable of further modifications, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and followed in the scope of the invention or the limits of the appended claims.

What is claimed is:

1. A liquid slurry composition for treating meat to reduce moisture loss incurred during cooking comprising:
   (a) from about 0.003% to about 1.98% by weight of about 1% to 10% acetic acid solution,
   (b) from about 0.102% to about 1.98% by weight of gelatin,
   (c) from about 1.05% to about 27.50% by weight of starch,
   (d) from about 0.003% to about 13.75% by weight of sodium chloride,
   (e) from about 0.003% to about 5.50% by weight of a phosphate salt, and
   (f) the balance being non-halogenated water.

2. A composition as in claim 1, wherein:
   (a) said acetic acid solution is 5% acid vinegar.

3. A composition as in claim 1, wherein:
   (a) said starch is non-gelatinized starch.

4. A composition as in claim 1, wherein:
   (a) said non-halogenated water is distilled water.

5. A composition as in claim 1, wherein:
   (a) said phosphate salt is selected from the group consisting of sodium tripolyphosphate, disodium phosphate, monosodium phosphate, sodium metaphosphate, sodium polyphosphate, sodium pyrophosphate, sodium acid pyrophosphate, dipotassium phosphate, monopotassium phosphate, potassium pyrophosphate and potassium tripolyphosphate.

6. A composition as in claim 5, wherein:
   (a) said phosphate salt is sodium tripolyphosphate.

7. A composition as in claim 1, comprising:
   (a) about 0.75% by weight of 5% acid vinegar as said acetic acid solution,
   (b) about 0.75% by weight of gelatin,
   (c) about 5.0% by weight of starch,
   (d) about 12.5% by weight of sodium chloride,
   (e) about 5.0% by weight of sodium tripolyphosphate as said phosphate salt, and
   (f) about 76.0% by weight of distilled water as said non-halogenated water.

8. A composition as in claim 1, comprising:

(a) about 0.26% by weight of 5% acid vinegar as said acetic acid solution,
(b) about 0.26% by weight of gelatin,
(c) about 1.74% by weight of starch,
(d) about 4.80% by weight of sodium chloride,
(e) about 1.91% by weight of sodium tripolyphosphate as said phosphate salt, and
(f) about 91.03% by weight of distilled water as said non-halogenated water.

9. A composition as in claim 1, comprising:
(a) about 0.20% by weight of 5% acid vinegar as said acetic acid solution,
(b) about 0.20% by weight of gelatin,
(c) about 1.36% by weight of starch,
(d) about 3.7% by weight of sodium chloride,
(e) about 1.3% by weight of sodium tripolyphosphate as said phosphate salt, and
(f) about 93.24% by weight of distilled water as said non-halogenated water.

10. A method of treating meat to reduce moisture loss incurred during cooking, including the steps of:
(a) combining from about 76.0% to about 93.24% by weight of non-halogenated water at a temperature of from about 32° F. to about 75° F., from about 0.003% to about 1.98% by weight of about 1% to 10% acetic acid solution, from about 0.102% to about 1.98% by weight of granular gelatin, and from about 1.05% to about 27.50% by weight of starch,
(b) agitating the ingredients of step (a) to disperse uniformly said gelatin and said starch throughout said water and said acetic acid solution to form a slurry,
(c) maintaining said slurry at a temperature of from about 32° F. to about 75° F. until said gelatin granules have become swollen and partially hydrated,
(d) agitating said slurry and mixing into said slurry from about 0.003% to about 13.75% by weight of sodium chloride and from about 0.003% to about 5.50% by weight of a phosphate salt and dissolving said sodium chloride and said phosphate salt to form a briny slurry,
(e) adding said briny slurry to a quantity of uncooked meat providing a briny slurry to uncooked meat ratio of about 1:10 to about 1:2, and
(f) dispersing uniformly said briny slurry throughout said meat by tumbling, kneading or massaging said meat.

11. A method as in claim 10, wherein:
(a) said acetic acid solution is 5% acid vinegar.

12. A method as in claim 10, wherein:
(a) said starch is non-gelatinized starch.

13. A method as in claim 10, wherein:
(a) said non-halogenated water is distilled water.

14. A method as in claim 10, wherein:
(a) said phosphate salt is selected from the group consisting of sodium tripolyphosphate, disodium phosphate, monosodium phosphate, sodium metaphosphate, sodium polyphosphate, sodium pyrophosphate, sodium acid pyrophosphate, dipotassium phosphate, monopotassium phosphate, potassium pyrophosphate, and potassium tripolyphosphate.

15. A method as in claim 14, wherein:
(a) said phosphate salt is sodium tripolyphosphate.

16. A method as in claim 10, including:
(a) combining and agitating said non-halogenated water and said acetic acid solution,
(b) combining and blending said starch and said gelatin, and
(c) adding said blended starch and said gelatin to said agitated non-halogenated water and acetic acid solution.

17. A method as in claim 10, including:
(a) agitating said non-halogenated water, said acetic acid solution, said gelatin and said starch for about 5 minutes.

18. A method as in claim 10, including:
(a) maintaining said slurry at a temperature of from about 32° F. to about 75° F. for about 20 minutes to swell and hydrate said gelatin granules.

19. A method as in claim 10, including:
(a) tumbling, kneading or massaging said meat for about 3 to about 5 hours to disperse said briny slurry uniformly throughout said meat.

20. A method as in claim 10, including:
(a) using whole, non-comminuted meat selected from the group consisting of beef, pork, lamb and poultry.

21. A method as in claim 20, including:
(a) adding said briny slurry to said meat by injecting said briny slurry into the interior of said meat.

22. A method as in claim 21, including:
(a) injecting said briny slurry into said meat by penetrating said meat with a plurality of spaced-apart injection needles and injecting said briny slurry under pressure through said needles.

23. A method as in claim 22, including:
(a) injecting said briny slurry continuously during penetration and withdrawl of said needles.

24. A method as in claim 10, including:
(a) using comminuted meat selected from the group consisting of beef, pork, lamb and poultry.

25. A method as in claim 24, including:
(a) forming said comminuted meat into molded or shaped food products including patties, sausages, wieners and luncheon meats after dispersing said briny slurry throughout said meat by tumbling, kneading or massaging said meat.

26. A method as in claim 10, including:
(a) cooking said meat after dispersing said briny slurry throughout said meat until the desired internal temperature is attained.

27. A method as in claim 26, including:
(a) cooking said meat by microwave heating.

28. A method as in claim 26, including:
(a) packaging said meat after dispersing said briny slurry throughout said meat and prior to cooking said meat.

29. A method as in claim 28, including:
(a) refrigerating or freezing said meat after cooking said meat.

30. A method as in claim 26, including:
(a) packaging said meat after cooking said meat.

31. A method as in claim 30, including:
(a) refrigerating or freezing said meat after packaging said meat.

32. A method as in claim 10, including:
(a) combining about 76.0% by weight of distilled water at a temperature of about 50° F., about 0.75% by weight of 5% acid vinegar, about 0.75% by weight of generally granular gelatin and about 5.0% by weight of salt,
(b) agitating the ingredients of step (a) for about 5 minutes to uniformly disperse said gelatin and said starch throughout said water and said vinegar to form a slurry, (c) maintaining said slurry at about 50° F. for about 20 minutes to swell and hydrate said gelatin granules, (d) agitating said slurry and mixing into said slurry about 12.5% by weight of sodium chloride and about 5.0% by weight of sodium tripolyphosphate and dissolving said sodium chloride and said sodium tripolyphosphate to form a briny slurry, (e) adding said briny slurry to a quantity of uncooked meat providing a briny slurry to meat ration of about 1:10, and (f) dispersing uniformly said briny slurry throughout said meat by tumbling, kneading, or massaging said meat.

33. A method as in claim 10, including:

(a) combining about 91.03% by weight of distilled water at a temperature of about 50° F., about 0.26% by weight of 5% acid vinegar, about 0.26% by weight of generally granular gelatin and about 1.74% by weight of starch, (b) agitating the ingredients of step (a) for about 5 minutes to uniformly disperse said gelatin and said starch throughout said water and said vinegar to form a slurry, (c) maintaining said slurry at about 50° F. for about 20 minutes to swell and hydrate said gelatin granules, (d) agitating and mixing into said slurry bout 4.80% by weight of sodium chloride and about 1.91% by weight of sodium tripolyphosphate and dissolving said sodium chloride and said sodium tripolyphosphate to form a briny slurry, (e) adding said briny slurry to a quantity of meat providing a briny slurry to meat ratio of about 3.5:10, and (f) dispersing uniformly said briny slurry throughout said meat by tumbling, kneading, or massaging said meat.

34. A method as in claim 10, including:

(a) combining about 93.24% by weight of distilled water at a temperature of about 50° F., about 0.20% by weight of 5% acid vinegar, about 0.20% by weight of generally granular gelatin and about 1.36% by weight of starch, (b) agitating the ingredients of step (a) for about 5 minutes to uniformly disperse said gelatin and said starch throughout said water and said vinegar to form a slurry, (c) maintaining said slurry at a temperature of about 50° F. for about 20 minutes to swell and hydrate said gelatin granules, (d) agitating and mixing into said slurry about 3.7% by weight of sodium chloride and about 1.3% by weight of sodium tripolyphosphate and dissolving said sodium chloride and said sodium tripolyphosphate to form a briny slurry, (e) adding said briny slurry to a quantity of meat providing a briny slurry to meat ratio of about 1:2, and (f) dispersing uniformly said briny slurry throughout said meat by tumbling, kneading or massaging said meat.

35. A method as in claim 10, including:

(a) maintaining said briny slurry in an agitated state prior to adding said briny slurry to said meat.

* * * * *